Figure 1:
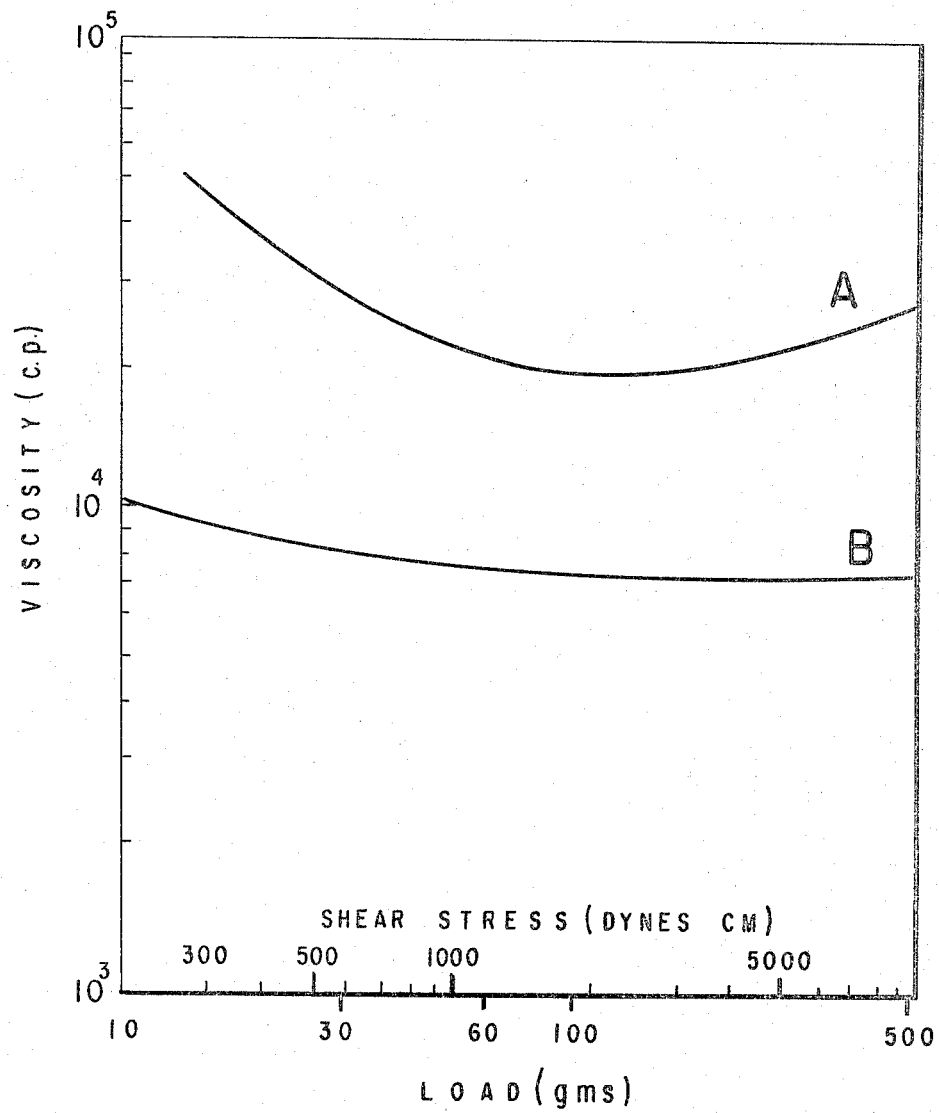

United States Patent Office

3,318,825
Patented May 9, 1967

3,318,825
VINYL POLYMER MIXTURE ADAPTED FOR THE PREPARATION OF DISPERSIONS COMPOSED OF POLYVINYLCHLORIDE AND PLASTICIZERS
Eduard Enk and Herbert Reinecke, Burghausen, Upper Bavaria, Germany, assignors to Wacker-Chemie G.m.b.H., Munich, Germany, a firm of Germany
Filed Sept. 8, 1961, Ser. No. 136,809
Claims priority, application Germany, Sept. 13, 1960, W 28,558
9 Claims. (Cl. 260—8)

This invention relates to polyvinylchloride polymer mixtures useful for the preparation of low-viscosity dispersions with conventional plasticizers in low amounts. It more particularly relates to development of low-viscosity polyvinylchloride platisols and organosols.

It has been a problem to prepare vinyl polymers adapted for the preparation of dispersions or pastes containing polyvinylchloride and plasticizers, optionally with concurrent use of non-solubilizing or only slightly solubilizing or swelling organic diluents, i.e., the so-called plastisols or organosols, which vinyl polymers would make it possible to control in simple fashion the viscosities of the dispersions prepared therewith at a given plasticizer content. The hardness of the end products produced from these dispersions or pastes depends upon the amount of plasticizer required for plastification. Consequently, for hard shaped objects and coatings the content of plasticizer should be kept as low as possible. Hence, there is a demand for polyvinylchloride polymers whose mixtures with 50% or less by weight of plasticizers are still liquid and also remain liquid during storage.

It is known that the viscosity of dispersions or pastes, composed of emulsion polymerizates (particle size below 10μ) and containing a relatively small amount of a plasticizer, can be lowered by the addition of suspension polymerizates having a particle size of about 50 to 200μ. However, because of the relatively large particle size of these suspension polymerizates, the preparation of the dispersions or pastes with the aid of the customary pressure rolls is difficult. On the other hand, if particles having a size below 50μ, which are obtained by screening the suspension polymerizates, are admixed with emulsion polymerizates and the plasticizer is added, such a mixture does not produce a lowering of the viscosity. Instead, the plasticizer is soaked up by the suspension polymerizate particles so that the mass is no longer a liquid.

It is an object of the present invention to develop polyvinylchloride mixtures which have low viscosities when admixed with 50% or less by weight of plasticizer.

Another object of the present invention is to provide polyvinylchloride mixtures which will form pastes of particularly low viscosity or pastes which, even with a low plasticizer content, still have a sufficiently low viscosity so as to facilitate further processing.

A further object of the invention is to provide a vinyl polymer mixture adapted for the preparation of dispersions of (1) vinyl polymers selected from the group consisting of polyvinylchloride and copolymers of polyvinylchloride containing at least 80% by weight of polyvinylchloride, and (2) plasticizers, optionally with concurrent use of non-solubilizing or low-solubilizing or swelling organic diluents, said vinyl polymer mixture consisting of:

(a) 1 to 99% by weight, based on the amount of vinyl polymer, of polymerizates of vinylchloride or its copolymers, which have been obtained by polymerization in aqueous dispersions in the presence of ionic emulsifiers, optionally with concurrent use of non-ionic emulsifiers, but in the absence of protective colloids, and (b) 99 to 1% by weight, based on the amount of vinyl polymers, of polymerizates of vinylchloride or its copolymers, which have been obtained by polymerization of a stable, aqueous monomer dispersion, prepared prior to polymerization, in the presence of protective colloids, optionally with concurrent use of small amounts of ionic and/or non-ionic emulsifiers.

It is also an object of the present invention to provide polyvinylchloride mixtures which produce pastes with plasticizers having a particularly high viscosity which are also desirable for some purposes of use.

These and other objects of the invention will become more apparent as the description thereof proceeds.

In the drawings, FIGURE 1 represents viscosity curves showing the improvement according to the invention (Curve B) and FIGURE 2 represents viscosity curves of mixtures of vinyl polymers according to the invention. A fuller explanation of the figures is to be found in the specific examples.

The subject matter of the present invention is a mixture of polymerizates of vinylchloride or of copolymers thereof which consists of at least 80% by weight of polyvinylchloride, which mixture is adapted for the preparation of dispersions in plasticizers, optionally with concurrent use of non-solubilizing or only slightly solubilizing or swelling organic solvents, and which does not exhibit the disadvantages of such previously known mixtures.

The mixture of vinyl polymers selected from the group consisting of polyvinylchloride and copolymers of polyvinylchloride containing at least 80% by weight of polyvinylchloride, according to the present invention, consists of:

(a) 1 to 99% by weight, based on the amount of vinyl polymers, of polymerizates of vinylchloride or copolymers thereof, which have been obtained by polymerization in aqueous dispersions in the presence of ionic emulsifiers, optionally with concurrent use of non-ionic emulsifiers, but in the absence of protective colloids, and (b) 99 to 1% by weight, based on the amount of the vinyl polymers, of polymerizates of vinylchloride or copolymers thereof, which have been prepared by polymerization of a stable, aqueous monomer dispersion, prepared prior to the polymerization, in the presence of protective colloids, optionally with concurrent use of small amounts of ionic and/or non-ionic emulsifiers.

Component $a$ is therefore an emulsion polymerizate and component $b$ is a suspension polymerizate prepared by forming a stable, aqueous monomer dispersion with a protective colloid and polymerizing the dispersion.

Preferred are those mixtures which contain 5 to 80% by weight of component $a$ and 95 to 20% by weight of component $b$.

For the preparation of the copolymers of vinylchloride which may be used in accordance with the present invention, all monomers which can be copolymerized with vinylchloride in accordance with known methods may be employed. However, preferred are those which contain only one polymerizable group, namely, the group

These monomers can be designated by the formula:

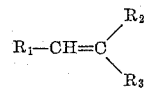

wherein $R_1$ is a radical selected from the group consisting of hydrogen, bromine,

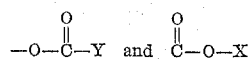

$R_2$ is a radical selected from the group consisting of hydrogen, chlorine and

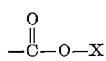

and together with $R_1$ form a radical selected from the group consisting of

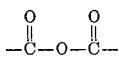

and

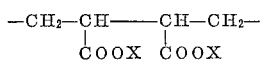

$R_3$ is a radical selected from the group consisting of hydrogen, chlorine,

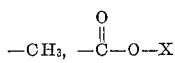

and

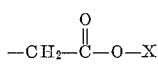

with the proviso that when $R_3$ is selected from the group consisting of hydrogen, chlorine and $-CH_3$, only one of $R_1$ and $R_2$ can represent hydrogen; Y is a radical selected from the group consisting of hydrogen, lower alkyl and phenyl; and X is a radical selected from the group consisting of hydrogen and alkyl having from 1 to 17 carbon atoms. Typical examples of these compounds are: vinylbromide, vinylidenechloride, vinylesters with organic acids, such as vinyl formate, vinyl acetate and vinyl benzoate, acrylic compounds, such as methyl acrylate, methyl methacrylate, as well as unsaturated dicarboxylic acids, such as fumaric acid, maleic acid, methylene malonic acid, itaconic acid, citraconic acid or tetrahydrophthalic acid, and the mono- and di-esters of these acids, such as dimethyl maleate, diethyl maleate and di-n-butyl maleate, mono-(2-ethylhexyl) maleate, dimethyl fumarate, diethyl fumarate, di-n-butyl fumarate, di-n-(2-ethylhexyl) fumarate and di-lauryl fumarate. Of course, copolymers which have been prepared from more than two monomers, for example the copolymerizate of 86% by weight of vinylchloride, 13% by weight of vinyl acetate and 1% by weight of maleic acid anhydride, may also be employed for the invention.

Numerous processes for the preparation of the polymers which are to be used as component $a$ according to the invention are known. However, particularly preferred are those processes, in which the vinylchloride, possibly together with other monomers, is emulsified into a stable monomer dispersion prior to heating to the polymerization temperature in water which contains the ionic and optionally non-ionic emulsifiers, and the emulsion thus obtained is polymerized in accordance with known methods with the aid of monomer-soluble polymerization catalysts. Processes which are based upon this principle are, for example, those described in German Patents 962,834 and 1,069,387, as well as British Patent 698,359.

In place of a polymerizate or copolymerizate of vinylchloride which has been prepared by polymerization of a stable, aqueous monomer dispersion, as described above, the component $a$ may also consist of polymerizates which have been prepared in accordance with known methods by emulsion-polymerization in aqueous dispersions in the presence of ionic emulsifiers, optionally with concurrent use of non-ionic emulsifiers, with the aid of water-soluble polymerization catalysts. Examples of water-soluble polymerization catalysts, that is, free radical-forming compounds, are $H_2O_2$, ammonium persulfate, sodium perborate or sodium percarbonate. The polymerization catalysts are employed in amounts of 0.01 to 5% by weight, preferably 0.02 to 1% by weight, based upon the weight of monomer or monomers.

The total amount of ionic and non-ionic emulsifiers is in most instances about 0.1 to 2% by weight, based on the monomer or monomers. As already mentioned, the preparation of the polymers used as component $a$ according to the invention is carried out in the absence or substantial absence of protective colloids. This means that either no protective colloids are present at all or, at the most, not more than 0.09% by weight of protective colloid, based upon the weight of monomer or monomers, is used in the preparation of component $a$.

Among emulsion polymerizates used as component $a$, those are preferred which are obtained by the use of a seeding technique. Through the use of seed latex, that is a preformed polymer emulsion, prior to and during the final polymerization, only those emulsifier amounts are used which do not exceed that necessary for covering the surface of the particular polymer molecules which may be present. Processes which are based upon this method are, for example, those described in German Patent 843,163 and in French Patent 1,153,895.

Of course, component $a$ may also consist of mixtures of polymers which have been obtained by various methods involving polymerization in aqueous dispersion in the presence of ionic emulsifiers, optionally with concurrent use of non-ionic emulsifiers, but in the absence of protective colloids. An example of such mixtures is a mixture of 50% by weight of a polymer according to French Patent 1,153,895 and 50% by weight of a polymer according to German Patent 1,069,387.

Similar to the preparation of polymerizates which are used as component $a$ according to the invention, the processes for the preparation of the polymerizates to be used as component $b$ in the invention are also known; they are prepared by polymerization of a stable, aqueous monomer dispersion, prepared prior to the polymerization, in the presence of protective colloids as described in German published applications 1,050,062 and 1,076,373.

The protective colloids used in this process are organic polymers which are customarily employed as protective colloids in suspension polymerizations. (See C. E. Schildknecht, "Polymer Processes," New York, 1956, pages 78–81.) Examples of such protective colloids are polyvinylalcohol, which may still contain up to 40 mol percent of acetyl groups, gelatins and cellulose derivatives, such as water-soluble methyl cellulose, carboxymethyl cellulose, hydroxyethyl cellulose, as well as copolymers of maleic acid or its mono-esters with styrene. The protective colloids are employed in amounts of 0.1 to 5% by weight, perferably 0.3 to 2% by weight, based upon the weight of monomer or monomers. In addition, preferably ionic and/or non-ionic emulsifiers are used in amounts of about 0.1 to 20% by weight, advantageously 1 to 10% by weight, based upon the protective colloid. The polymerization takes place in the usual manner with the aid of monomer-soluble, free radical-forming catalysts.

Examples of monomer-soluble polymerization catalysts are benzoyl peroxide, lauroyl peroxide, 2,4-dichlorobenzoyl peroxide or azoisobutyric acid dinitrole, all of which may advantageously be employed in combination with acetyl cyclohexanesulfonyl peroxide. These monomer-soluble catalysts are employed in amounts of 0.1 to 5% by weight, preferably 0.2 to 1% by weight, based on the monomer or monomers, both in the production of polymers $a$ by polymerization of a stable, aqueous monomer emulsion in the absence of protective colloids, as well as in the production of polymers $b$ in the presence of protective colloids.

In all cases the polymerization takes place under the temperature conditions which are customary for the free radical polymerization of vinylchloride, that is between approximately room temperature and 100° C., preferably at about 35 to 60° C.

Anion active emulsifiers are preferably used as ionic emulsifiers. Examples of these are alkali metal salts and especially ammonium salts of the fatty acids, such as lauric acid or palmitic acid; acid phosphoric acid alkyl esters, such as sodium diethylhexyl phosphate; acid fatty alcohol sulfates; paraffin sulfonic acids; alkyl naphthalene sulfonic acid; and sulfosuccinic acid dialkyl esters. Very suitable are also alkali metal salts and ammonium salts of fatty acids containing epoxy groups, such as ammonium epoxy stearate, or the alkali metal and ammonium salts of the reaction products of peracids, such as peracetic acid, with unsaturated fatty acids, such as oleic or linoleic acid, which reaction is accompanied by formation of dihydroxy stearic acid and hydroxy acetoxy stearic acid, for example, as well as the alkali metal and ammonium salts of the reaction product of peracid with unsaturated hydroxy fatty acids, such as ricinoleic acid. However, cation active emulsifiers, such as lauryl pyridinum hydrochloride, may also be employed.

Examples of non-ionic emulsifiers which may optionally be employed concurrently in the polymerization process are partial fatty acid esters of polyvalent alcohols, such as glycerin monostearate, sorbitol monolaurate or sorbitol monopalmitate, partial fatty alcohol ethers of polyvalent alcohols, polyoxyethylene ethers of fatty alcohols or aromatic hydroxy compounds, as well as the known polypropylene oxide-polyethylene oxide condensation products sold under the trade name "Pluronics."

From the vinyl polymer mixtures according to the invention with components $a$ and $b$, it is possible to prepare plastisols or organosols in accordance with known methods, for example, by stirring with the plasticizer, optionally with concurrent use of volatile and/or non-volatile, non-solubilizing or slightly solubilizing or swelling organic diluents. Additives which are usually employed in plastisols and organosols, such as stabilizers, dyes, pigments and fillers, may also be concurrently used.

The dispersions thus obtained exhibit a considerably lower viscosity than that which would have been expected on the basis of their content of polyvinylchloride or copolymers of vinylchloride, obtained by polymerization in aqueous dispersions in the presence of ionic emulsifiers, optionally with concurrent use of non-ionic emulsifiers, but in the absence of protective colloids. This is surprising. The polymers $b$ obtained in the presence of protective colloids, which are added in accordance with the present invention, in contrast to suspension polymers previously used for lowering the viscosity, have about the same order of magnitude of particle size as component $a$.

As stated previously, if suspension polymerizates having a particle size below $50\mu$, are present in about the same order of magnitude in component $a$, which suspension polymerizates have not been produced according to the invention by polymerization of a stable, aqueous monomer dispersion prepared prior to the polymerization, but rather by customary suspension polymerization methods and subsequent screening, no depression of the viscosity of the plastisol dispersion is produced; instead, an increase in the viscosity is obtained.

As plasticizers, it is possible to employ all monomeric and polymeric compounds which are customarily used as plasticizers for polyvinylchloride and its copolymers (see H. Gnamm-W. Sommer, "Die Losungsmittel und Weichmachungsmittel," Stuttgart, 1958, pages 589 to 735). Preferred are high boiling point esters of completely esterified di-and tri-carboxylic acids as well as completely esterified polyvalent inorganic acids, such as di-n-butylphthalate, di-2-ethylhexyl phthalate, diethylsebacate, triethylcitrate or tricresylphosphate.

In plastisols, the plasticizers are employed in amounts of 15 to 200% by weight, preferably from 15 to 100% by weight, based upon the weight of vinyl polymers.

For the preparation of organosols, as is well known, not only 10 to 50% by weight of plasticizers but also 10 to 50% by weight, each based upon the weight of polymers, of non-volatile, non-solubilizing or only slightly solubilizing or swelling organic diluents are employed. In addition, it is possible to use also volatile diluents in any desired amounts since, on account of their volatility, they are no longer present in the finished articles prepared from the organosols. An organosol of this type may, as described in German Patent 918,659, contain high boiling point esters as plasticizers, petroleum extracts with a boiling point above 125° C. at 1 mm./Hg as non-volatile diluents, and hydrocarbons having a boiling point in the range of 35 to 250° C. as volatile diluents.

The dispersions produced from the mixtures according to the present invention may be applied in customary fashion to fabrics by coating, spraying, immersion or brushing, or may also be employed for the preparation of cast shaped bodies and foam substances.

The following examples are illustrative of the invention. The are not, however, to be construed as limiting the invention. Obviously, expedients known to those skilled in the art may be substituted for the specific embodiments hereinafter disclosed.

EXAMPLE 1

Component (a) emulsion polymerizate

In accordance with German Patent 1,069,387, a polymerizate $a$ was produced by the following process:

In a pressure vessel having a capacity of 2 liters, which has been equipped with a homogenizer according to Prof. Willems, which is sold under the trademark "Atomixmill," a mixture of 900 gm. vinylchloride, 900 gm. of water purified by passage through ion-exchanger resins, 4.5 gm. ammonium epoxystearate, 4.5 gm. sorbitol monopalmitate and 0.9 gm. lauryl peroxide was intensively homogenized for one minute. The homogenizer was then turned off and after fifteen minutes of standing the small amount of vinylchloride which had separated on the surface was removed. The monomer dispersion was now heated without stirring for thirty hours at 50° C. in tubes made of V2A steel. The polymer dispersion formed thereby, having a solids content of 48%, was dried by spray drying in a stream of warm air.

This polyvinylchloride polymerizate is hereafter referred to as polymerizate $a$.

EXAMPLE 2

Component (a) emulsion polymerizate from seed latex

A polymerizate $a'$ was prepared according to French Patent 1,153,895.

(a) For the preparation of the seed latex, 120 kg. of distilled water, 120 gm. of potassium persulfate, 100 gm. of sodium laurate and 100 gm. of sodium hydroxide were placed into an enameled autoclave equipped with a stirrer and having a capacity of 200 liters. After removal of the air by means of nitrogen, 60 kg. of vinylchloride were forced into the autoclave under pressure and the contents were stirred at 50° C. for fifteen hours. The polyvinylchloride emulsion thus obtained had at this time a solids content of 30%. Its soap-free, polymer surface was saturated by the addition of a warm 10% sodium laurate solution; 30 kg. of 10% sodium laurate solution were required therefor. The latex thus produced did not contain any free emulsifier. Its average particle size, determined with the aid of an electron microscope, amounted to $0.15\mu$.

(b) For the purpose of preparing a polyvinylchloride latex with a particle size of $0.4\mu$, 8 kg. of a seed latex having a solids content of 30% and a particle size of $0.15\mu$, prepared from vinylchloride according to (a) above, were added to a solution of 60 gm. of potassium persulfate and 40 gm. of sodium hydroxide in 125 kg. of distilled water in a pressure vessel provided with a stirrer, and after removal of the air with the aid of an inert gas or by evacuation, 60 kg. of vinylchloride were added thereto. After stirring the mixture at 40° C. for twenty hours, the polymerization was complete. An emulsion was obtained having a solids content of 30%, a surface tension of 61 dynes/cm. and a particle size of $0.4\mu$, as determined with the aid of the electron microscope. The dispersion was worked up by spray drying.

This polyvinylchloride polymerizate is hereinafter referred to as polymerizate $a'$.

EXAMPLE 3

*Component (b) suspension polymerizate*

A polymerizate b was prepared by the following steps:

In a pressure vessel having a capacity of 2 liters, a mixture of 1,000 gm. of water purified by passage through ion exchange resins, 800 gm. of vinylchloride, 1.2 gm. of lauryl peroxide, 160 gm. of a 5% aqueous polyvinylalcohol solution having a saponification number of 180 and 0.4 gm. of sorbitol monolaurate were homogenized by intensive agitation into a stable emulsion of the vinylchloride in the aqueous phase prior to the polymerization. Thereafter the emulsion was polymerized at 50° C. for twenty hours accompanied by stirring. The dispersion thus obtained was worked up by vacuum filtering, washing and drying in a warm stream of air. By milling and screening, a polyvinylchloride with a particle size below $10\mu$ was obtained.

This polyvinylchloride polymerizate is hereinafter referred to as polymerizate b.

EXAMPLE 4

*Plastisol*

70 parts of polyvinylchloride prepared according to Example 1 (polymerizate a) and 30 parts of polyvinylchloride prepared according to Example 3 (polymerizate b) were admixed with 50 parts of di-2-ethylhexyl phthalate. The viscosity of the plastisol was determined and compared with that of a plastisol produced by admixing 100 parts of polyvinylchloride polymerizate a with 50 parts of di-2-ethylhexyl phthalate.

The surprising reduction of the plastisol viscosity by admixing a polymer produced according to Example 3, by suspension polymerization in the presence of protective colloids, with a polymer produced according to Example 1, is illustrated by FIGURE 1 of the drawings. Curve A is that obtained by the mixture of 100 parts of polyvinylchloride polymerizate a with 50 parts of di-2-ethylhexyl phthalate. Burve B shows the viscosity of the paste consisting of 70 parts of polyvinylchloride polymerizate a, 30 parts of polyvinylchloride polymerizate b, and 50 parts of di-2-ethylhexyl phthalate.

The viscosities were determined at varying sheer stresses as indicated.

EXAMPLE 5

*Plastisols*

Varying mixture ratios of polyvinylchloride polymerizate a prepared according to Example 1 and polyvinylchloride polymerixate b prepared according to Example 3 were made and 100 parts of each of the mixtures were admixed with 50 parts of di-2-ethylhexyl phthalate. The plastisol mixtures obtained in this manner exhibited, after gelling, a low water-absorption and a high electrical insulation resistance with good transparency.

The viscosities of the various plastisols were determined at a constant sheer stress of 9,500 dynes/cm.

Figure 2A:
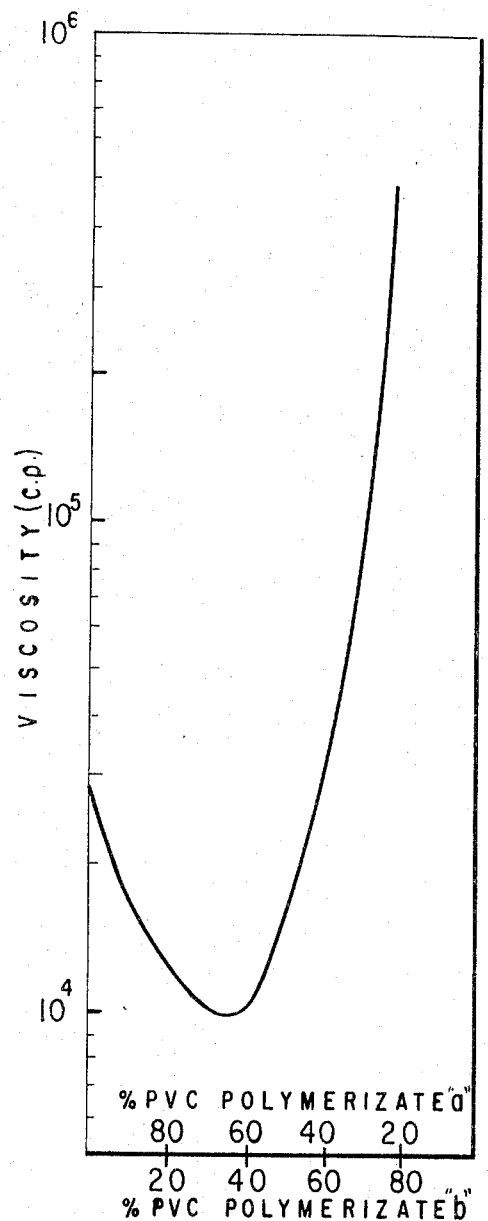

FIGURE 2A illustrates the change of the plastisol viscosity at various mixture ratios of polyvinylchloride polymerizate a to polyvinylchloride polymerizate b. In each case 100 parts of the mixture of $a+b$ were admixed with 50 parts of di-2-ethylhexyl phthalate.

EXAMPLE 6

Similarly as in Example 5, the polyvinylchloride polymerizate b may also be admixed with polyvinylchloride polymerizate a' prepared according to Example 2 by the emulsion process, to produce a similar effect.

Varying mixture ratios of polyvinylchloride polymerizate a' prepared according to Example 2 and polyvinylchloride polymerizate b prepared according to Example 3 were made and 100 parts of the mixtures were admixed with 50 parts of di-2-ethylhexyl phthalate. The viscosities of the various plastisols so produced were determined at a constant sheer stress of 9,500 dynes/cm.

Figure 2B:
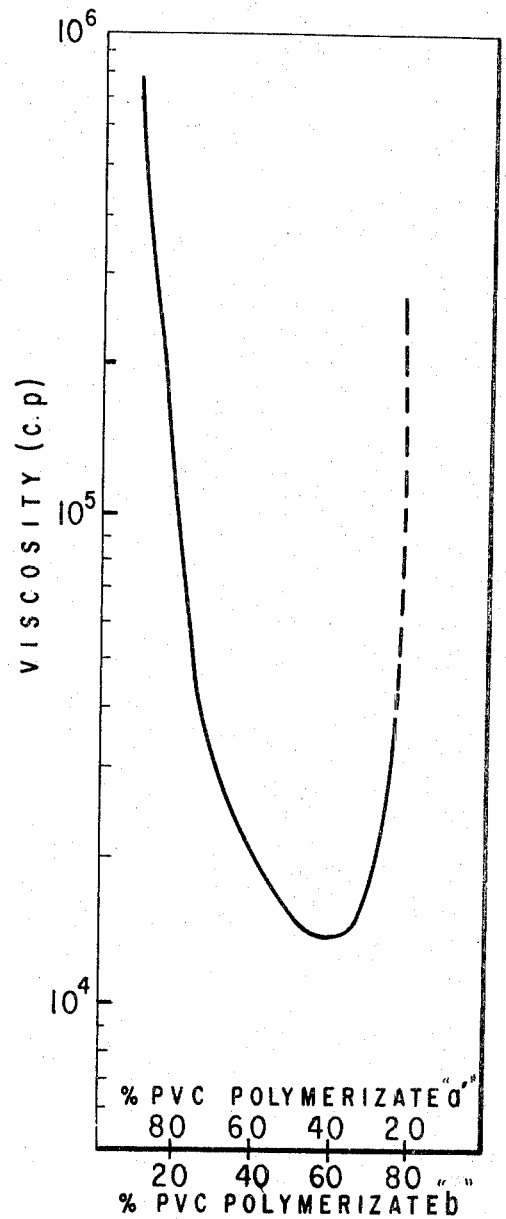

FIGURE 2B illustrates the change of the plastisols viscosity at various mixture ratios of polyvinylchloride polymerizate a' to polyvinylchloride polymerizate b.

The mixtures of these two components in the plastisols exhibited a low dispersion viscosity. Neither polyvinylchloride polymerizate a' nor polyvinylchloride polymerizate b produced a flowing liquid when 2 parts of polyvinylchloride were used per 1 part of di-2-ethylhexyl phthalate.

Similar curves were exhibited by mixtures of polyvinylchloride polymerizate a plus polyvinylchloride polymerizate a' plus polyvinylchloride polymerizate b.

The viscosity measurements were performed at 25° C. with a visco-scale according to Hoppler with special measuring device No. 3. The plasticizer ratio in all cases was 100 parts of polyvinylchloride to 50 parts of di-2-ethylhexyl phthalate.

While we have disclosed specific embodiments of our invention, it will be readily apparent to one skilled in the art that the present invention is not limited to these specific embodiments and that various changes and modifications may be made without departing from the spirit of the invention and the scope of the appended claims.

We claim:

1. A vinyl polymer mixture adapted for the preparation of dispersions, said vinyl polymer mixture consisting of
   (a) 20 to 99% by weight, based on the amount of vinyl polymer of polymerizates of monomers selected from the group consisting of vinylchloride and mixtures containing at least 80% vinylchloride with polymerizable monomers having the formula

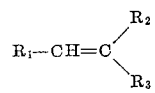

wherein $R_1$ is a radical selected from the group consisting of hydrogen, bromine,

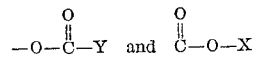

$R_2$ is a radical selected from the group consisting of hydrogen, chlorine and

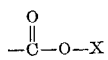

and together with $R_1$ form a radical selected from the group consisting of

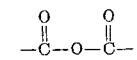

and

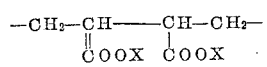

$R_3$ is a radical selected from the group consisting of hydrogen, chlorine,

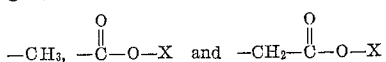

with the proviso that when $R_3$ is selected from the group consisting of hydrogen, chlorine and —$CH_3$, only one of $R_1$ and $R_2$ can represent hydrogen; Y is a radical selected from the group consisting of hydrogen, lower alkyl and phenyl; and X is a radical selected from the group consisting of hydrogen and alkyl having from 1 to 17 carbon atoms, which polymerizates have been obtained by free-radical polymerization in aqueous dispersions in the presence of emulsifiers selected from the group consisting of ionic emulsifiers and mixtures of ionic and non-ionic emulsifiers, but in the substantial absence of protective colloids and
   (b) 80 to 1% by weight, based on the amount of vinyl polymer of polymerizates of monomers selected from the group consisting of vinylchloride and mixtures containing at least 80% vinylchloride with polymerizable monomers having the formula

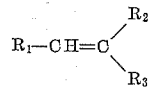

wherein $R_1$ is a radical selected from the group consisting of hydrogen, bromine, $$-O-\overset{O}{\underset{\|}{C}}-Y \quad \text{and} \quad \overset{O}{\underset{\|}{C}}-O-X$$

$R_2$ is a radical selected from the group consisting of hydrogen, chlorine and $$-\overset{O}{\underset{\|}{C}}-O-X$$

and together with $R_1$ form a radical selected from the group consisting of

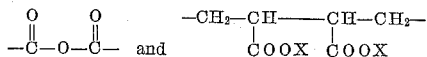

$R_3$ is a radical selected from the group consisting of hydrogen, chlorine, $$-CH_3, \quad -\overset{O}{\underset{\|}{C}}-O-X \quad \text{and} \quad -CH_2-\overset{O}{\underset{\|}{C}}-O-X$$

with the proviso that when $R_3$ is selected from the group consisting of hydrogen, chlorine and $-CH_3$, only one of $R_1$ and $R_2$ can represent hydrogen; Y is a radical selected from the group consisting of hydrogen, lower alkyl and phenyl; and X is a radical selected from the group consisting of hydrogen and alkyl having from 1 to 17 carbon atoms, which polymerizates have been obtained by free-radical polymerization of a stable, aqueous monomer dispersion prepared prior to polymerization, in the presence of 0.3 to 2% by weight, based on the weight of the monomers of a protective colloid, and from 0.1 to 20% by weight, based on the weight of the protective colloid of an emulsifier selected from the group consisting of ionic emulsifiers, non-ionic emulsifiers and mixtures thereof.

2. A vinyl polymer mixture according to claim 1, containing 5 to 80% by weight of component $a$ and 95 to 20% by weight of component $b$.

3. A vinyl polymer mixture according to claim 1 wherein said component $a$ was obtained by free-radical polymerization of a stable, aqueous monomer dispersion, prepared prior to polymerization with the aid of a monomer-soluble free-radical polymerization catalyst.

4. A vinyl polymer mixture according to claim 1 wherein said component $a$ was obtained by emulsion polymerization using water-soluble free-radical polymerization catalysts.

5. A vinyl polymer mixture according to claim 1 wherein said component $a$ is a mixture of polymerizates obtained by free-radical polymerization of a stable, aqueous monomers dispersion, prepared prior to polymerization, with the aid of monomer-soluble free-radical polymerization catalysts, and by emulsion polymerization using water-soluble free-radical polymerization catalysts.

6. A free-flowing polymer dispersion comprising the vinyl polymer mixture according to claim 1 and from 15 to 200% by weight, based on the weight of the vinyl polymer of a plasticizer.

7. A free-flowing polymer dispersion comprising the vinyl polymer mixture according to claim 1, from 10 to 50% by weight, based on the weight of the vinyl polymer of a plasticizer and from 10 to 50% by weight of a non-volatile softener selected from the group consisting of non-solubilizing organic diluents, slightly solubilizing organic diluents and swelling organic diluents.

8. A polyvinylchloride mixture adapted for the preparation of dispersions of (1) polyvinylchloride and (2) plasticizers, said polyvinylchloride mixture consisting of
  (a) 5 to 80% by weight of the polyvinylchloride mixture of polyvinylchloride obtained by free-radical polymerization in the presence of from 0.1 to 2% by weight of emulsifiers selected from the group consisting of ionic emulsifiers and mixtures of ionic and non-ionic emulsifiers, but in the absence of protective colloids, and
  (b) 20 to 95% by weight of the polyvinylchloride mixture of polyvinylchloride obtained by free-radical polymerization of a stable, aqueous monomer dispersion, prepared prior to polymerization, in the presence of from 0.3 to 2% by weight, based on the weight of the vinylchloride, of a protective colloid and from 0.1 to 20% by weight, based on the weight of the protective colloid of an emulsifier selected from the group consisting of ionic emulsifiers, non-ionic emulsifiers and mixtures thereof.

9. A low viscosity plastisol comprising the polyvinylchloride mixture according to claim 8 and from about 15 to 100% by weight based on the weight of the polyvinylchloride mixture of a high boiling point polyester plasticizer.

References Cited by the Examiner

UNITED STATES PATENTS

| 2,494,517 | 1/1950 | Naps | 260—92.8 |
| 2,868,763 | 8/1955 | Montgomery | 260—899 |
| 3,050,412 | 7/1962 | Coe | 260—899 |

FOREIGN PATENTS 769,132  4/1955  Great Britain.

WILLIAM H. SHORT, *Primary Examiner.*

M. STERMAN, *Examiner.*

J. W. BEHRINGER, E. M. WOODBERRY,
*Assistant Examiners.*